(12) United States Patent
Cho et al.

(10) Patent No.: US 9,765,210 B2
(45) Date of Patent: Sep. 19, 2017

(54) THERMOPLASTIC RESIN COMPOSITION AND MOLDED ARTICLE PRODUCED THEREFROM

(71) Applicant: Samsung SDI Co., Ltd., Yongin-si (KR)

(72) Inventors: Jin Kyung Cho, Uiwang-si (KR); Kee Hae Kwon, Uiwang-si (KR); In Chol Kim, Uiwang-si (KR); Chang Min Hong, Uiwang-si (KR)

(73) Assignee: Lotte Advanced Materials Co., Ltd., Yongin-si (KR)

( * ) Notice: Subject to any disclaimer, the term of this patent is extended or adjusted under 35 U.S.C. 154(b) by 0 days.

(21) Appl. No.: 15/099,770

(22) Filed: Apr. 15, 2016

(65) Prior Publication Data

US 2016/0304711 A1 Oct. 20, 2016

(30) Foreign Application Priority Data

Apr. 17, 2015 (KR) .......................... 10-2015-0054754
Mar. 4, 2016 (KR) .......................... 10-2016-0026686

(51) Int. Cl.
*C08F 265/06* (2006.01)
*C08L 33/12* (2006.01)

(52) U.S. Cl.
CPC .................................. *C08L 33/12* (2013.01)

(58) Field of Classification Search
CPC .. C08L 69/00; C08L 2207/04; C08L 2203/30; C08L 2205/035
See application file for complete search history.

(56) References Cited

U.S. PATENT DOCUMENTS

| | | | | |
|---|---|---|---|---|
| 9,346,942 B2 * | 5/2016 | Chung | .................. | C08K 5/5419 |
| 9,469,759 B2 * | 10/2016 | Chung | .................. | C08L 33/10 |
| 2016/0185959 A1 * | 6/2016 | Kim | ........................ | C08L 69/00 525/67 |
| 2016/0319128 A1 * | 11/2016 | Park | ........................ | C08L 69/00 |
| 2016/0326358 A1 * | 11/2016 | Lee | ........................ | C08L 25/12 |
| 2017/0002198 A1 * | 1/2017 | Jeong | ..................... | C08L 69/00 |

FOREIGN PATENT DOCUMENTS

| KR | 0725940 B1 | 5/2007 |
|---|---|---|
| KR | 2009-0038507 A | 4/2009 |

* cited by examiner

*Primary Examiner* — Hannah Pak
(74) *Attorney, Agent, or Firm* — Additon, Higgins & Pendleton, P.A.

(57) ABSTRACT

Disclosed herein is a thermoplastic resin composition. The thermoplastic resin composition includes: a matrix resin including a resin including a methyl methacrylate repeat unit; and an impact modifier, wherein the impact modifier includes a first core-shell type impact modifier including a butadiene rubber polymer core and a second core-shell type impact modifier including an acrylate rubber polymer core, and the second impact modifier is present in a greater amount than the first impact modifier. The thermoplastic resin composition can exhibit excellent properties in terms of weatherability, colorability, and gloss.

9 Claims, No Drawings

THERMOPLASTIC RESIN COMPOSITION AND MOLDED ARTICLE PRODUCED THEREFROM

CROSS-REFERENCE TO RELATED APPLICATION

This application claims priority under 35 USC Section 119 to and the benefit of Korean Patent Application No. 10-2015-0054754, filed Apr. 17, 2015, and Korean Patent Application No. 10-2016-0026686, filed Mar. 4, 2016, the entire disclosure of each of which is incorporated herein by reference.

FIELD

The present invention relates to a thermoplastic resin composition and a molded article produced from the same.

BACKGROUND

Recently, there has been a need for an unpainted material to overcome problems of high manufacturing costs and environmental pollution in the fields of automotive interior/exterior materials, housings of electronic products, and the like.

A poly(methyl methacrylate) (PMMA) resin used as such an unpainted material can have excellent properties in terms of weatherability and scratch resistance and can exhibit good coloring properties due to the transparency thereof, but can have problems of poor impact resistance and gloss.

To overcome these problems, an impact modifier can be added to a poly(methyl methacrylate) resin to supplement poor impact strength of the poly(methyl methacrylate) resin. However, typical impact modifiers have a limitation in improving weatherability and coloring properties along with impact strength.

Therefore, there is a need for a thermoplastic resin composition, which can provide excellent properties in terms of weatherability, colorability, and gloss while supplementing impact resistance of a poly(methyl methacrylate) resin and thus can be applied to the fields of automotive interior/exterior materials, housings of electronic products, and the like, without being painted.

SUMMARY OF THE INVENTION

Embodiments of the present invention provide a thermoplastic resin composition which is capable of providing excellent properties in terms of weatherability, colorability, and gloss, and a molded article formed of the same.

The thermoplastic resin composition includes: a matrix resin including a resin including a methyl methacrylate repeat unit; and an impact modifier, wherein the impact modifier includes a first core-shell type impact modifier including a butadiene rubber polymer core and a second core-shell type impact modifier including an acrylate rubber polymer core, and the second impact modifier is present in a greater amount than the first impact modifier.

In exemplary embodiments, a weight ratio of the first impact modifier to the second impact modifier may range from about 1:about 1.5 to about 1:about 3.

In exemplary embodiments, the thermoplastic resin composition may include about 50 wt % to about 95 wt % of the matrix resin, about 1 wt % to about 20 wt % of the first impact modifier, and about 1 wt % to about 30 wt % of the second impact modifier.

In exemplary embodiments, the matrix resin may include about 50 wt % to about 98 wt % of the methyl methacrylate repeat unit, about 1 wt % to about 40 wt % of a styrene repeat unit, and about 1 wt % to about 10 wt % of an acrylonitrile repeat unit. A weight ratio of the styrene repeat unit to the acrylonitrile repeat unit may range from about 1:about 0.15 to about 1:about 0.3.

In exemplary embodiments, the first impact modifier may include about 40 wt % to about 99 wt % of a butadiene rubber polymer core and about 1 wt % to about 60 wt % of a shell, and the second impact modifier may include about 60 wt % to about 99 wt % of an acrylate rubber polymer core and about 1 wt % to about 40 wt % of a shell.

In exemplary embodiments, the shell of the first impact modifier may include a styrene repeat unit and an acrylonitrile repeat unit, and the shell of the second impact modifier may include a methyl methacrylate repeat unit.

In exemplary embodiments, the shell of the first impact modifier may include about 60 wt % to about 99 wt % of a styrene repeat unit and about 1 wt % to about 40 wt % of an acrylonitrile repeat unit, and the shell of the second impact modifier may include about 60 wt % to about 99.9 wt % of a methyl methacrylate repeat unit and about 0.1 wt % to about 40 wt % of a methyl acrylate repeat unit.

In exemplary embodiments, the thermoplastic resin composition may have a brightness (L) of about 0.1 to about 4.8, as measured on an injection molded specimen having a size of about 90 mm×about 50 mm×about 2 mm in accordance with ASTM D2244.

In exemplary embodiments, the thermoplastic resin composition may have a color difference ($\Delta E$) of about 2.0 or less, as calculated according to Equation 1:

$$\Delta E = \sqrt{(\Delta L)^2 + (\Delta a)^2 + (\Delta b)^2}$$ [Equation 1]

where $\Delta L$ is a difference between L values before/after exposure evaluation ($L_1 - L_0$); $\Delta a$ is a difference between a values before/after exposure evaluation ($a_1 - a_0$); $\Delta b$ is a difference between b values before/after exposure evaluation ($b_1 - b_0$); $L_0$, $a_0$, and $b_0$ are initial color (brightness (L) and chroma (a, b)), as measured on a black injection molded specimen having a size of about 90 mm×about 50 mm×about 2 mm in accordance with ASTM D2244; and $L_1$, $a_1$, and $b_1$ are color after exposure evaluation, as measured on the specimen in accordance with ASTM D2244 after exposure evaluation for 1,500 hours under conditions in accordance with SAE J1960.

In exemplary embodiments, the thermoplastic resin composition may have an Izod impact strength of about 2.5 kgf·cm/cm to about 7 kgf·cm/cm, as measured on a ⅛" thick notched specimen in accordance with ASTM D256, and may have a gloss of about 85 GU to about 95 GU, as measured on an injection molded specimen having a size of about 90 mm×about 50 mm×about 2 mm at 60° in accordance with ASTM D523.

There is also provided a molded article formed of the thermoplastic resin composition as set forth above.

DETAILED DESCRIPTION

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

A thermoplastic resin composition according to the present invention includes: (A) a matrix resin including a methyl methacrylate repeat unit; and (B) an impact modifier.

(A) Matrix Resin

The matrix resin includes a resin including a methyl methacrylate repeat unit (a repeat unit derived from methyl methacrylate) and can improve gloss properties and coloring properties of the thermoplastic resin composition by adjusting the amount of the methyl methacrylate repeat unit.

In exemplary embodiments, the matrix resin may include about 50 wt % to about 98 wt %, for example, about 55 wt % to about 90 wt %, of the methyl methacrylate repeat unit, about 1 wt % to about 40 wt %, for example, about 3 wt % to about 35 wt %, of a styrene repeat unit, and about 1 wt % to about 10 wt %, for example, about 2 wt % to about 7 wt %, of an acrylonitrile repeat unit.

In some embodiments, the matrix resin may include the methyl methacrylate repeat unit in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98 wt %. Further, according to some embodiments of the present invention, the methyl methacrylate repeat unit may be present in an amount of from about any of the foregoing amounts to about any other of the foregoing amounts.

In some embodiments, the matrix resin may include the styrene repeat unit in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the styrene repeat unit may be present in an amount of from about any of the foregoing amounts to about any other of the foregoing amounts.

In some embodiments, the matrix resin may include the acrylonitrile repeat unit in an amount of about 1, 2, 3, 4, 5, 6, 7, 8, 9, or 10 wt %. Further, according to some embodiments of the present invention, the acrylonitrile repeat unit may be present in an amount of from about any of the foregoing amounts to about any other of the foregoing amounts.

Within these ranges, it is possible to reduce the difference in the index of refraction between the matrix resin and the impact modifier and to improve coloring properties of the thermoplastic resin composition.

In addition, a weight ratio of the styrene repeat unit to the acrylonitrile repeat unit may range from about 1:about 0.15 to about 1:about 0.3, for example, about 1:about 0.2 to about 1:about 0.25. Within this range, it is possible to reduce the difference in index of refraction between the matrix resin and the impact modifier and to further improve coloring properties of the thermoplastic resin composition.

In exemplary embodiments, the matrix resin can be obtained by mixing a poly(methyl methacrylate) (PMMA) resin including (for example consisting of) a methyl methacrylate repeat unit and a methyl methacrylate-styrene-acrylonitrile copolymer (MSAN) resin including a methyl methacrylate repeat unit, a styrene repeat unit, and an acrylonitrile repeat unit such that amounts of the repeat units in the matrix resin are within the above ranges. In other exemplary embodiments, the matrix resin may only include an MSAN resin in which the repeat units are present in amounts in the above ranges.

In exemplary embodiments, the matrix resin may have a weight average molecular weight (Mw) of about 10,000 g/mol to about 200,000 g/mol, for example, about 20,000 g/mol to about 150,000 g/mol, as measured by gel permeation chromatography (GPC), without being limited thereto.

In exemplary embodiments, the thermoplastic resin composition may include the matrix resin in an amount of about 50 wt % to about 95 wt %, for example, about 70 wt % to about 95 wt %, based on the total weight (100 wt %) of the thermoplastic resin composition. In some embodiments, the thermoplastic resin composition may include the matrix resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments of the present invention, the matrix resin may be present in an amount of from about any of the foregoing amounts to about any other of the foregoing amounts.

Within this range, the thermoplastic resin composition can exhibit excellent properties in terms of weatherability, colorability, gloss, impact resistance, and balance therebetween.

(B) Impact Modifier

The impact modifier may include (B1) a first core-shell type impact modifier including a butadiene rubber polymer core and (B2) a second core-shell type impact modifier including an acrylate rubber polymer core, wherein the impact modifier (B2) is present in a greater amount than the first impact modifier (B1). The impact modifier can improve weatherability, coloring properties, and gloss properties of thermoplastic resin compositions depending on the kind and amount thereof.

In exemplary embodiments, a weight ratio (B1:B2) of the first impact modifier (B1) to the second impact modifier (B2) may range from about 1:about 1.5 to about 1:about 3, for example, about 1:about 1.9 to about 1:about 2.6. Within this range, it is possible to reduce the difference in index of refraction between the impact modifier and the matrix resin, which can thereby further improve weatherability and coloring properties of the thermoplastic resin composition.

(B1) First Impact Modifier

In exemplary embodiments, the first impact modifier may be a core-shell type impact modifier including about 40 wt % to about 99 wt %, for example, about 50 wt % to about 90 wt %, of a butadiene rubber polymer core and about 1 wt % to about 60 wt %, for example, about 10 wt % to about 50 wt %, of a shell.

In some embodiments, the first impact modifier may include the butadiene rubber polymer core in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the butadiene rubber polymer core may be present in an amount of from about any of the foregoing amounts to about any other of the foregoing amounts.

In some embodiments, the first impact modifier may include the shell in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the shell may be present in an amount of from about any of the foregoing amounts to about any other of the foregoing amounts.

When the amounts of the core and shell are within the above ranges, the thermoplastic resin composition can exhibit excellent properties in terms of colorability, impact resistance, and the like.

In exemplary embodiments, the first impact modifier may be prepared by grafting a shell component including styrene and acrylonitrile to the core (rubber polymer) to form a shell including a styrene repeat unit and an acrylonitrile repeat unit. Here, the shell component may be grafted to the core by any suitable polymerization method known in the art, such as emulsion polymerization, suspension polymerization, and mass polymerization.

In exemplary embodiments, the core of the first impact modifier may be a butadiene rubber polymer (rubber). Examples of the butadiene rubber polymer may include without limitation polybutadiene, poly(styrene-butadiene), poly(acrylonitrile-butadiene), and the like, and combinations thereof.

In addition, the rubber polymer may have an average particle size (Z-average) of about 0.05 µm to about 6 µm, for example, about 0.15 µm to about 4 µm. Within this range, the thermoplastic resin composition can exhibit excellent properties in terms of impact resistance, processability, and appearance.

In exemplary embodiments, the shell of the first impact modifier may include about 60 wt % to about 99 wt %, for example, about 70 wt % to about 95 wt %, of a styrene repeat unit and about 1 wt % to about 40 wt %, for example, about 5 wt % to about 30 wt %, of an acrylonitrile repeat unit.

In some embodiments, the shell of the first impact modifier may include the styrene repeat unit in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the styrene repeat unit may be present in an amount of from about any of the foregoing amounts to about any other of the foregoing amounts.

In some embodiments, the shell of the first impact modifier may include the acrylonitrile repeat unit in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the acrylonitrile repeat unit may be present in an amount of from about any of the foregoing amounts to about any other of the foregoing amounts.

Within these ranges, the thermoplastic resin composition can exhibit excellent properties in terms of impact resistance, processability, and appearance.

In exemplary embodiments, the thermoplastic resin composition may include the first impact modifier in an amount of about 1 wt % to about 20 wt %, for example, about 1 wt % to about 10 wt %, based on the total weight (100 wt %) of the thermoplastic resin composition. In some embodiments, the thermoplastic resin composition may include the first impact modifier in an amount of about 1, 2, 3, 4, 5, 6, 7, 8, 9, 10, 11, 12, 13, 14, 15, 16, 17, 18, 19, or 20 wt %. Further, according to some embodiments of the present invention, the first impact modifier may be present in an amount of from about any of the foregoing amounts to about any other of the foregoing amounts.

Within this range, the thermoplastic resin composition can exhibit excellent properties in terms of weatherability, colorability, gloss, impact resistance, and balance therebetween.

(B2) Second Impact Modifier

In exemplary embodiments, the second impact modifier may be a core-shell type impact modifier including about 60 wt % to about 99 wt %, for example, about 70 wt % to about 90 wt %, of an acrylate rubber polymer core and about 1 wt % to about 40 wt %, for example, about 10 wt % to about 30 wt %, of a shell. Within these ranges, the thermoplastic resin composition can exhibit excellent weatherability.

In some embodiments, the second impact modifier may include the acrylate rubber polymer core in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt %. Further, according to some embodiments of the present invention, the acrylate rubber polymer core may be present in an amount of from about any of the foregoing amounts to about any other of the foregoing amounts.

In some embodiments, the second impact modifier may include the shell in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the shell may be present in an amount of from about any of the foregoing amounts to about any other of the foregoing amounts.

In exemplary embodiments, the second impact modifier may be prepared by grafting a shell component including methyl methacrylate and methyl acrylate to the core (rubber polymer) to form a shell including a methyl methacrylate repeat unit and a methyl acrylate repeat unit. Here, the shell component may be grafted to the core by any suitable polymerization method known in the art, such as emulsion polymerization, suspension polymerization, and mass polymerization.

In exemplary embodiments, the core of the second impact modifier may include an acrylate rubber polymer (rubber). Examples of the acrylate rubber polymer may include without limitation alkyl (meth)acrylate rubber, a copolymer of alkyl (meth)acrylate and an aromatic vinyl compound, and the like, and combinations thereof, for example, a $C_2$ to $C_{10}$ alkyl acrylate rubber, a copolymer of a $C_2$ to $C_{10}$ alkyl acrylate and styrene, and a combination thereof, and as another example a butyl acrylate rubber, a copolymer of butyl acrylate, ethyl acrylate and styrene, and a combination thereof. Herein, the copolymer of alkyl (meth)acrylate and an aromatic vinyl compound may be obtained by polymerization of about 70 wt % to about 90 wt % of alkyl (meth)acrylate with about 10 wt % to about 30 wt % of an aromatic vinyl compound, without being limited thereto.

The rubber polymer may have an average particle size (Z-average) of about 0.05 µm to about 6 µm, for example, about 0.15 µm to about 4 µm. Within this range, the thermoplastic resin composition can exhibit excellent properties in terms of impact resistance, processability, and appearance.

In exemplary embodiments, the shell of the second impact modifier may include about 60 wt % to about 99.9 wt %, for example, about 70 wt % to about 99.5 wt %, of a methyl methacrylate repeat unit and about 0.1 wt % to about 40 wt %, for example, about 0.5 wt % to about 30 wt %, of a methyl acrylate repeat unit. Within these ranges, the thermoplastic resin composition can exhibit excellent properties in terms of processability and appearance.

In some embodiments, the shell of the second impact modifier may include the methyl methacrylate repeat unit in an amount of about 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.1, 99.2, 99.3, 99.4, 99.5, 99.6, 99.7, 99.8, or 99.9 wt %. Further, according to some embodiments of the present invention, the methyl methacrylate repeat unit may be present in an amount of from about any of the foregoing amounts to about any other of the foregoing amounts.

In some embodiments, the shell of the second impact modifier may include the methyl acrylate repeat unit in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the methyl acrylate repeat unit may be present in an amount of from about any of the foregoing amounts to about any other of the foregoing amounts.

In exemplary embodiments, the thermoplastic resin composition may include the second impact modifier in an amount of about 1 wt % to about 30 wt %, for example, about 1 wt % to about 25 wt %, based on the total weight (100 wt %) of the thermoplastic resin composition. In some embodiments, the thermoplastic resin composition may include the second impact modifier in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the second impact modifier may be present in an amount of from about any of the foregoing amounts to about any other of the foregoing amounts.

Within this range, the thermoplastic resin composition can exhibit excellent properties in terms of weatherability, colorability, gloss, impact resistance, and balance therebetween.

In addition to the above components, the thermoplastic resin composition according to the present invention may further include one or more additives such as one or more or flame retardants, antioxidants, lubricants, release agents, nucleating agents, antistatic agents, UV stabilizers, pigments, dyes, and the like, and combinations thereof. The additives may be present in an amount of about 20 parts by weight or less, for example, about 0.1 parts by weight to about 10 parts by weight, based on about 100 parts by weight of the thermoplastic resin composition, without being limited thereto.

The thermoplastic resin composition according to the present invention may have a brightness (L) of about 0.1 to about 4.8, for example, about 0.1 to about 4.5, as measured on a black injection molded specimen having a size of about 90 mm×about 50 mm×about 2 mm in accordance with ASTM D2244. Specifically, the brightness is measured on an injection molded specimen, to which a given amount of carbon black, as a black colorant, is applied, using a colorimeter (CM-3600d, Konica Minolta Co., Ltd.) in specular component excluded (SCE) mode in accordance with ASTM D2244. Here, a lower brightness value indicates better blackness (colorability).

In exemplary embodiments, the thermoplastic resin composition may have a color difference ($\Delta E$) of about 2.0 or less, for example, about 0.3 to about 1.9, as calculated according to Equation 1:

$$\Delta E = \sqrt{(\Delta L)^2 + (\Delta a)^2 + (\Delta b)^2}$$ [Equation 1]

wherein $\Delta L$ is a difference between L values before/after exposure evaluation ($L_1-L_0$); $\Delta a$ is a difference between a values before/after exposure evaluation ($a_1-a_0$); $\Delta b$ is a difference between b values before/after exposure evaluation ($b_1-b_0$); $L_0$, $a_0$, and $b_0$ are initial color (brightness (L) and chroma (a, b)), as measured on an injection molded specimen having a size of about 90 mm×about 50 mm×about 2 mm using a colorimeter (CM-3600d, Konica Minolta Co., Ltd.) in accordance with ASTM D2244; and $L_1$, $a_1$, and $b_1$ are color after exposure evaluation, as measured using a colorimeter (CM-3600d, Konica Minolta Co., Ltd.) in accordance with ASTM D2244 after exposure evaluation for 1,500 hours under conditions in accordance with SAE J1960.

Herein, the color difference ($\Delta E$) is an index of color difference in a Commission Internationale de l'Eclairage (CIE) Lab color system. In the CIE Lab color system, brightness is designated by L, and chromaticities indicative of color and chroma are designated by a and b, respectively. A higher a value indicates a color closer to red, whereas a lower a value indicates a color closer to green. A higher b value indicates a color closer to yellow, whereas a lower b value indicates a color closer to blue. In addition, a lower color difference ($\Delta E$) indicates better weatherability.

In exemplary embodiments, the thermoplastic resin composition may have an Izod impact strength of about 2.5 kgf·cm/cm to about 7 kgf·cm/cm, for example, about 3 kgf·cm/cm to about 6.5 kgf·cm/cm, as measured on a ⅛" thick notched specimen in accordance with ASTM D256, and may have a gloss of about 85 GU to about 95 GU, as measured on an injection molded specimen having a size of about 90 mm×about 50 mm×about 2 mm at 60° in accordance with ASTM D523.

A molded article according to the present invention may be produced from the thermoplastic resin composition as set forth above. The thermoplastic resin composition may be prepared by any suitable thermoplastic resin composition preparation method known in the art. For example, the aforementioned components and, optionally, the additives, can be mixed, followed by melt extrusion in an extruder, thereby preparing a thermoplastic resin composition in pellet form. The prepared pellets may be formed into a molded article (product) by various molding methods such as injection molding, extrusion, vacuum molding, and casting. Such molding methods are well known to those skilled in the art to which the present invention pertains. The molded article may be applied to the field of interior/exterior materials for vehicles, electric/electronic products, and the like. For example, the molded article can be useful as a luxurious low gloss material (interior/exterior material).

Next, the present invention will be described in more detail with reference to the following examples. However, it should be noted that these examples are provided for illustration only and should not be construed in any way as limiting the invention.

EXAMPLE

Details of components used in the following Examples and Comparative Examples are as follows:

(A) Matrix Resin (A-1) Poly(methyl methacrylate) (PMMA) resin

A PMMA resin having a weight average molecular weight of 80,000 g/mol (IF-850, LG Chemicals) is used.

(A-2) Methyl methacrylate-styrene-acrylonitrile copolymer (MSAN) resin

An MSAN resin (weight average molecular weight: 100,000 g/mol) obtained by polymerization of a monomer mixture including 25 wt % of methyl methacrylate, 60 wt % of styrene, and 15 wt % of acrylonitrile is used.

(A-3) Polystyrene (PS) Resin

A PS resin having a weight average molecular weight of 270,000 g/mol is used.

(A-4) Styrene-Acrylonitrile Copolymer (SAN) Resin

A SAN resin (weight average molecular weight: 140,000 g/mol) obtained by polymerization of a monomer mixture including 75 wt % of styrene and 25 wt % of acrylonitrile is used.

(B) Impact Modifier (B-1) First Impact Modifier

A core-shell type butadiene-based rubber-modified graft copolymer (g-ABS) prepared by grafting 50 wt % of styrene and acrylonitrile (styrene/acrylonitrile (weight ratio)=75/25), as a shell component, to 50 wt % of polybutadiene rubber having an average particle diameter of 0.3 µm, as a rubber polymer (core), is used.

(B-2) Second Impact Modifier

A core-shell type acrylate-based rubber-modified graft copolymer prepared by grafting 30 wt % of methyl methacrylate and methyl acrylate (methyl methacrylate/methyl acrylate (weight ratio)=99/1), as a shell component, to 70 wt % of poly(butyl acrylate-ethyl acrylate-styrene) rubber having an average particle diameter of 0.4 µm, as a rubber polymer (core), is used.

(C) Carbon Black

HI-BLACK 50L available from Orion Engineered Carbons Co., Ltd is used.

Examples 1 to 5 and Comparative Examples 1 to 7

The above components are mixed in amounts as listed in Table 1, followed by melt extrusion in a twin-screw extruder having L/D of 29 and a diameter of 45 mm at a barrel temperature of 240° C., thereby preparing a thermoplastic resin composition in pellet form. The prepared pellets are dried at 80° C. for 2 hours, followed by injection molding using a 6 oz. injection machine at a cylinder temperature of 250° C. and at a mold temperature of 60° C., thereby preparing a specimen for property evaluation. The prepared specimen is evaluated as the following properties, and results are shown in Table 1.

Property Evaluation (1) Brightness (L): Brightness is measured on an injection molded specimen having a size of 90 mm×50 mm×2 mm using a colorimeter (CM-3600d, Konica Minolta Co., Ltd.) in specular component excluded (SCE) mode in accordance with ASTM D2244.

(2) Gloss (unit: GU): Gloss is measured on an injection molded specimen having a size of 90 mm×50 mm×2 mm at 60° using a glossmeter (UGV-6P, Suga Test Instruments Co., Ltd.) in accordance with ASTM D523.

(3) Weatherability (color difference ($\Delta E$)): A color difference of each of the specimens is calculated according to Equation 1, $$\Delta E = \sqrt{(\Delta L)^2 + (\Delta a)^2 + (\Delta b)^2}$$ [Equation 1]

wherein $\Delta L$ is a difference between L values before/after exposure evaluation ($L_1-L_0$); $\Delta a$ is a difference between a values before/after exposure evaluation ($a_1-a_0$); $\Delta b$ is a difference between b values before/after exposure evaluation ($b_1-b_0$); $L_0$, $a_0$, and $b_0$ are initial color (brightness (L) and chroma (a, b)), as measured on an injection molded specimen having a size of 90 mm×50 mm×2 mm using a colorimeter (CM-3600d, Konica Minolta Co., Ltd.) in accordance with ASTM D2244; and $L_1$, $a_1$, and $b_1$ are color after exposure evaluation, as measured using a colorimeter (CM-3600d, Konica Minolta Co., Ltd.) in accordance with ASTM D2244 after exposure evaluation for 1,500 hours using a weather-ometer (Ci5000, Atlas Electric Devices Company) under conditions in accordance with SAE J1960.

(4) Notched Izod impact strength (unit: kgf·cm/cm): Izod impact strength is measured on a 1/8" thick notched Izod specimen in accordance with ASTM D256.

TABLE 1

| | | Example | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| (A) | (A-1) | 65 | 51.7 | 55 | 41.7 | 76.7 | — | 85 | 85 | 65 | 17 | 65 | 65 |
| (wt %) | (A-2) | 20 | 33.3 | 20 | 33.3 | 13.3 | — | — | — | 20 | 20 | 20 | 20 |
| | (A-3) | — | — | — | — | — | 85 | — | — | — | — | — | — |
| | (A-4) | — | — | — | — | — | — | — | — | — | 48 | — | — |
| (B) | (B-1) | 5 | 5 | 7 | 7 | 3 | 15 | 15 | — | 10 | 5 | 15 | — |
| (wt %) | (B-2) | 10 | 10 | 18 | 18 | 7 | — | — | 15 | 5 | 10 | — | 15 |
| (C) (parts by weight) | | 0.1 | 0.1 | 0.1 | 0.1 | 0.1 | 0.1 | 0.1 | 0.1 | 0.1 | 0.1 | 0.1 | 0.1 |
| Difference in index of refraction between (A) and (B) | | 0.001 | 0.008 | 0.003 | 0.014 | 0.005 | 0.050 | 0.049 | 0.000 | 0.018 | 0.045 | 0.034 | 0.014 |
| Repeat unit of | MMA | 82 | 71 | 80 | 67 | 89 | — | 100 | 100 | 82 | 26 | 82 | 82 |
| (A) (wt %) | SM | 14 | 24 | 16 | 27 | 9 | 100 | — | — | 14 | 56 | 14 | 14 |
| | AN | 4 | 6 | 4 | 7 | 2 | — | — | — | 4 | 18 | 4 | 4 |
| Brightness (L) | | 3.0 | 4.5 | 3.0 | 3.5 | 3.1 | 6.0 | 8.0 | 5.0 | 5.5 | 6.5 | 6.6 | 6.5 |
| Gloss (GU) | | 88 | 93 | 90 | 95 | 85 | 100 | 80 | 77 | 88 | 98 | 94 | 82 |
| Color difference ($\Delta E$) | | 0.8 | 1.1 | 1.5 | 1.9 | 0.3 | 5.2 | 2.2 | 0.2 | 1.3 | 3.4 | 4.0 | 2.7 |
| Notched Izod impact strength (kgf·cm/cm) | | 4.0 | 4.0 | 6.0 | 6.5 | 3.0 | 10.0 | 3.0 | 2.0 | 6.5 | 4.3 | 7.0 | 4.0 |

* Parts by weight: parts by weight based on 100 parts by weight of (A) + (B), MMA: methyl methacrylate repeat unit, SM: styrene repeat unit, AN: acrylonitrile repeat unit From the results shown in Table 1, it can be seen that the thermoplastic resin compositions according to the present invention (Examples 1 to 5) have excellent properties in terms of brightness (colorability), gloss, weatherability, and impact resistance.

Conversely, it can be seen that the thermoplastic resin compositions not satisfying the present invention (Comparative Examples 1 to 7) exhibit considerably poor properties in terms of at least one of brightness, gloss, weatherability, and impact resistance and thus could not provide the effects of the present invention.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

What is claimed is:

1. A thermoplastic resin composition comprising:
a matrix resin comprising a resin including a methyl methacrylate repeat unit; and
an impact modifier,
wherein the impact modifier comprises a first core-shell impact modifier comprising a butadiene rubber polymer core and a second core-shell impact modifier comprising an acrylate rubber polymer core,
wherein the second impact modifier is present in a greater amount than the first impact modifier, and
wherein the shell of the first impact modifier comprises about 60 wt % to about 99 wt % of a styrene repeat unit and about 1 wt % to about 40 wt % of an acrylonitrile repeat unit, and the shell of the second impact modifier comprises about 60 wt % to about 99.9 wt % of a methyl methacrylate repeat unit and about 0.1 wt % to about 40 wt % of a methyl acrylate repeat unit,
wherein the thermoplastic resin composition has a color difference ($\Delta E$) of about 2.0 or less, as calculated according to Equation 1:

$$\Delta E = \sqrt{(\Delta L)^2 + (\Delta a)^2 + (\Delta b)^2}$$ [Equation 1]

wherein $\Delta L$ is a difference between L values before/after exposure evaluation ($L_1 - L_0$); $\Delta a$ is a difference between a values before/after exposure evaluation ($a_1 - a_0$); $\Delta b$ is a difference between b values before/after exposure evaluation ($b_1 - b_0$); $L_0$, $a_0$, and $b_0$ are initial color (brightness (L) and chroma (a, b)), as measured on an injection molded specimen having a size of about 90 mm×about 50 mm×about 2 mm in accordance with ASTM D2244; and $L_1$, $a_1$, and $b_1$ are color after exposure evaluation, as measured on the specimen in accordance with ASTM D2244 after exposure evaluation for 1,500 hours under conditions in accordance with SAE J1960.

2. The thermoplastic resin composition according to claim 1, wherein a weight ratio of the first impact modifier to the second impact modifier ranges from about 1:about 1.5 to about 1:about 3.

3. The thermoplastic resin composition according to claim 1, comprising: about 50 wt % to about 95 wt % of the matrix resin; about 1 wt % to about 20 wt % of the first impact modifier; and about 1 wt % to about 30 wt % of the second impact modifier.

4. The thermoplastic resin composition according to claim 1, wherein the matrix resin comprises about 50 wt % to about 98 wt % of the methyl methacrylate repeat unit and further comprises about 1 wt % to about 40 wt % of a styrene repeat unit and about 1 wt % to about 10 wt % of an acrylonitrile repeat unit.

5. The thermoplastic resin composition according to claim 4, wherein a weight ratio of the styrene repeat unit to the acrylonitrile repeat unit ranges from about 1:about 0.15 to about 1:about 0.3.

6. The thermoplastic resin composition according to claim 1, wherein the first impact modifier comprises about 40 wt % to about 99 wt % of the butadiene rubber polymer core and about 1 wt % to about 60 wt % of a shell, and the second impact modifier comprises about 60 wt % to about 99 wt % of the acrylate rubber polymer core and about 1 wt % to about 40 wt % of a shell.

7. The thermoplastic resin composition according to claim 1, wherein the thermoplastic resin composition further has a brightness (L) of about 0.1 to about 4.8, as measured on an injection molded specimen having a size of about 90 mm×about 50 mm×about 2 mm in accordance with ASTM D2244.

8. The thermoplastic resin composition according to claim 1, wherein the thermoplastic resin composition further has an Izod impact strength of about 2.5 kgf·cm/cm to about 7 kgf·cm/cm, as measured on a ⅛" thick notched specimen in accordance with ASTM D256, and has a gloss of about 85 GU to about 95 GU, as measured on an injection molded specimen having a size of about 90 mm×about 50 mm×about 2 mm at 60° in accordance with ASTM D523.

9. A molded article formed from the thermoplastic resin composition according to claim 1.

* * * * *